(12) United States Patent
Sato et al.

(10) Patent No.: US 7,480,106 B2
(45) Date of Patent: Jan. 20, 2009

(54) IMAGING LENS

(75) Inventors: Kenichi Sato, Saitama (JP); Minoru Taniyama, Saitama (JP)

(73) Assignee: Fujinon Corporation, Saitama (JP)

( * ) Notice: Subject to any disclaimer, the term of this patent is extended or adjusted under 35 U.S.C. 154(b) by 0 days.

(21) Appl. No.: 11/802,710

(22) Filed: May 24, 2007

(65) Prior Publication Data

US 2007/0273981 A1 Nov. 29, 2007

(30) Foreign Application Priority Data

May 26, 2006 (JP) ............................ P2006-146992

(51) Int. Cl.
G02B 9/64 (2006.01)
G02B 13/22 (2006.01)

(52) U.S. Cl. ..................... 359/785; 359/716; 359/784

(58) Field of Classification Search ................. 359/716, 359/784, 785

See application file for complete search history.

(56) References Cited

U.S. PATENT DOCUMENTS

| | | | |
|---|---|---|---|
| 5,940,214 A | 8/1999 | Suzuki et al. | |
| 6,490,102 B1 | 12/2002 | Huang | |
| 6,961,191 B2 * | 11/2005 | Sato | 359/785 |
| 7,375,907 B2 * | 5/2008 | Lee | 359/784 |
| 7,394,602 B2 * | 7/2008 | Chen et al. | 359/785 |
| 7,408,725 B2 * | 8/2008 | Sato | 359/785 |
| 2004/0190162 A1 | 9/2004 | Sato | |
| 2008/0100925 A1 * | 5/2008 | Nakanishi | 359/716 |

FOREIGN PATENT DOCUMENTS

| | | |
|---|---|---|
| EP | 1 496 382 A2 | 1/2005 |
| EP | 1 591 820 A1 | 11/2005 |
| EP | 1 602 958 A1 | 12/2005 |
| EP | 1860476 A1 * | 11/2007 |
| JP | 2004-302058 A | 10/2004 |
| JP | 2005-292235 A | 10/2005 |

* cited by examiner

*Primary Examiner*—David N Spector
(74) *Attorney, Agent, or Firm*—Birch, Stewart, Kolasch & Birch, LLP (57) ABSTRACT

There is provided an imaging lens including a first lens having a positive refracting power, a second lens having a concave surface on an object side and having a negative refracting power, and a third lens having a positive refractive power and a meniscus shape having a convex surface on the object side and at a vicinity of an optical axis, in order from the object side. The imaging lens satisfies conditional equations below. f designates a focal length of the total system, f1 designates a focal length of the first lens, D2 designates an interval between the first lens and a second lens on an optical axis, ν123 designates an average of Abbe numbers of the first lens, the second lens and the third lens, and ν2 designates the Abbe number of the second lens.

$0.7 < f1/f < 1.3$ (1)

$0.25 < D2/f < 0.50$ (2)

$55 < \nu 123$ (3)

$|\nu 123 - \nu 2| < 5$ (4)

4 Claims, 9 Drawing Sheets

| | EMBODIMENT 1: LENS DATA | | | | |
|---|---|---|---|---|---|
| | Si (SURFACE NUMBER) | Ri (RADIUS OF CURVATURE) | Di (SURFACE INTERVAL) | Ndj (REFRACTIVE INDEX) | vdj (ABBE NUMBER) |
| G1 | 1 | 2.166 | 0.50 | 1.531 | 55.5 |
| G1 | 2 | 9.096 | 2.00 | | |
| G2 | 3 | −2.190 | 0.40 | 1.531 | 55.5 |
| G2 | 4 | 4.051 | 0.08 | | |
| G3 | 5 | 0.981 | 1.01 | 1.531 | 55.5 |
| G3 | 6 | 2.065 | 1.00 | | |
| GC | 7 | ∞ | 0.30 | 1.516 | 64.1 |
| GC | 8 | ∞ | 0.12 | | |

(f=4.70, FNO.=3.5)

FIG. 5B

| | EMBODIMENT 1: ASPHERICAL SURFACE DATA | | | | | |
|---|---|---|---|---|---|---|
| ASPHERICAL SURFACE COEFFICIENT | SURFACE NUMBER | | | | | |
| | FIRST SURFACE | SECOND SURFACE | THIRD SURFACE | FOURTH SURFACE | FIFTH SURFACE | SIXTH SURFACE |
| K | 2.861E+00 | 1.000E+00 | 3.349E+00 | 1.960E+00 | −6.565E−02 | −5.279E+00 |
| $A_3$ | −1.761E−02 | 2.590E−02 | 3.457E−02 | −3.433E−01 | −2.821E−01 | 1.712E−01 |
| $A_4$ | 5.072E−02 | −1.613E−01 | 3.333E−02 | 1.737E−01 | −4.946E−03 | −2.482E−01 |
| $A_5$ | −3.426E−01 | 1.418E−01 | 5.938E−02 | −1.556E−02 | 2.859E−02 | 1.098E−01 |
| $A_6$ | 6.549E−01 | −2.099E−01 | −1.159E−01 | −4.737E−02 | 1.176E−02 | −5.728E−03 |
| $A_7$ | −3.703E−01 | 2.650E−01 | −1.881E−02 | −2.058E−02 | −2.666E−03 | −7.256E−03 |
| $A_8$ | −5.403E−01 | 5.052E−02 | 3.291E−02 | 2.125E−02 | −2.566E−03 | 1.014E−04 |
| $A_9$ | 6.763E−01 | −3.118E−01 | 2.569E−02 | 1.887E−02 | 4.720E−04 | 8.861E−04 |
| $A_{10}$ | −1.812E−01 | 1.901E−01 | −1.960E−02 | −1.280E−02 | 4.894E−05 | −1.700E−04 |

FIG. 5C

| EMBODIMENT 1: DIFFRACTING SURFACE DATA | |
|---|---|
| DOE COEFFICIENT | SECOND SURFACE |
| $C_1$ | −1.249E+02 |
| $C_2$ | −1.502E+02 |
| $C_3$ | 5.953E+02 |
| $C_4$ | 3.135E+02 |
| $C_5$ | −9.459E+02 |

FIG. 6A

| | EMBODIMENT 2: LENS DATA | | | |
|---|---|---|---|---|
| Si (SURFACE NUMBER) | Ri (RADIUS OF CURVATURE) | Di (SURFACE INTERVAL) | Ndj (REFRACTIVE INDEX) | νdj (ABBE NUMBER) |
| G1 { 1 | 2.182 | 0.50 | 1.531 | 55.5 |
| 2 | 11.129 | 2.00 | | |
| G2 { 3 | −2.190 | 0.40 | 1.531 | 55.5 |
| 4 | 4.187 | 0.08 | | |
| G3 { 5 | 1.014 | 1.01 | 1.531 | 55.5 |
| 6 | 2.051 | 1.00 | | |
| GC { 7 | ∞ | 0.30 | 1.516 | 64.1 |
| 8 | ∞ | 0.12 | | |

(f=4.82, FNO.=3.5)

FIG. 6B

| | EMBODIMENT 2: ASPHERICAL SURFACE DATA | | | | | |
|---|---|---|---|---|---|---|
| ASPHERICAL SURFACE COEFFICIENT | SURFACE NUMBER | | | | | |
| | FIRST SURFACE | SECOND SURFACE | THIRD SURFACE | FOURTH SURFACE | FIFTH SURFACE | SIXTH SURFACE |
| K | 4.968E+00 | 1.000E+00 | 3.349E+00 | 5.962E+00 | −1.173E−01 | −5.279E+00 |
| $A_3$ | −3.051E−02 | 7.358E−03 | 3.457E−02 | −3.332E−01 | −2.874E−01 | 1.416E−01 |
| $A_4$ | 9.964E−02 | −8.851E−02 | 3.333E−02 | 1.609E−01 | 1.347E−04 | −2.316E−01 |
| $A_5$ | −5.135E−01 | 1.874E−01 | 5.938E−02 | −1.047E−02 | 3.152E−02 | 1.070E−01 |
| $A_6$ | 6.828E−01 | −2.532E−01 | −1.159E−01 | −4.566E−02 | 1.186E−02 | −5.728E−03 |
| $A_7$ | −2.594E−01 | 1.744E−01 | −1.881E−02 | −2.078E−02 | −2.906E−03 | −7.256E−03 |
| $A_8$ | −4.886E−01 | −8.724E−03 | 3.291E−02 | 1.888E−02 | −2.770E−03 | 1.014E−04 |
| $A_9$ | 6.294E−01 | −3.104E−01 | 2.569E−02 | 1.723E−02 | 4.296E−04 | 8.861E−04 |
| $A_{10}$ | −3.029E−01 | 2.778E−01 | −1.960E−02 | −1.147E−02 | 8.686E−05 | −1.700E−04 |

FIG. 6C

| EMBODIMENT 2: DIFFRACTING SURFACE DATA | |
|---|---|
| DOE COEFFICIENT | FIRST SURFACE |
| $C_1$ | −8.086E+01 |
| $C_2$ | 1.793E+01 |
| $C_3$ | −1.338E+02 |
| $C_4$ | 5.004E+01 |
| $C_5$ | 7.641E+01 |

FIG. 7A

| | EMBODIMENT 3: LENS DATA | | | |
|---|---|---|---|---|
| Si (SURFACE NUMBER) | Ri (RADIUS OF CURVATURE) | Di (SURFACE INTERVAL) | Ndj (REFRAC-TIVE INDEX) | vdj (ABBE NUMBER) |
| G1 { 1 | 2.085 | 0.71 | 1.531 | 55.5 |
| 2 | 23.579 | 1.29 | | |
| G2 { 3 | -2.029 | 0.40 | 1.531 | 55.5 |
| 4 | 5.231 | 0.08 | | |
| G3 { 5 | 1.052 | 1.10 | 1.510 | 56.2 |
| 6 | 1.851 | 1.00 | | |
| GC { 7 | ∞ | 0.30 | 1.516 | 64.1 |
| 8 | ∞ | 0.17 | | |

(f=4.50, FNO.=5.0)

FIG. 7B

| | EMBODIMENT 3: ASPHERICAL SURFACE DATA | | | | | |
|---|---|---|---|---|---|---|
| ASPHERICAL SURFACE COEFFICIENT | SURFACE NUMBER | | | | | |
| | FIRST SURFACE | SECOND SURFACE | THIRD SURFACE | FOURTH SURFACE | FIFTH SURFACE | SIXTH SURFACE |
| K | 4.974E+00 | 0.000E+00 | 3.349E+00 | -3.699E-01 | -2.448E-01 | -5.279E+00 |
| $A_3$ | -1.577E-02 | 2.349E-02 | 6.431E-02 | -2.873E-01 | -3.242E-01 | 8.075E-02 |
| $A_4$ | 1.009E-01 | -1.584E-01 | 9.333E-02 | 1.948E-01 | -6.062E-03 | -2.141E-01 |
| $A_5$ | -5.785E-01 | 3.252E-01 | 4.200E-02 | -1.690E-02 | 3.399E-02 | 1.054E-01 |
| $A_6$ | 4.707E-01 | -4.135E-01 | -1.707E-01 | -5.315E-02 | 1.220E-02 | -7.073E-03 |
| $A_7$ | -4.648E-02 | -9.113E-02 | -4.645E-02 | -2.706E-02 | -2.506E-03 | -7.586E-03 |
| $A_8$ | 6.585E-01 | 1.612E-01 | 4.932E-02 | 1.598E-02 | -2.538E-03 | 4.480E-05 |
| $A_9$ | 1.184E+00 | 7.734E-01 | 5.868E-02 | 1.891E-02 | 5.120E-04 | 9.011E-04 |
| $A_{10}$ | -4.095E+00 | -8.023E-01 | -3.911E-02 | -5.968E-03 | 6.952E-05 | -1.637E-04 |

FIG. 7C

| EMBODIMENT 3: DIFFRACTING SURFACE DATA | |
|---|---|
| DOE COEFFICIENT | SECOND SURFACE |
| $C_1$ | -9.394E+01 |
| $C_2$ | 5.580E+01 |
| $C_3$ | -3.534E+02 |
| $C_4$ | 8.511E+02 |
| $C_5$ | -6.721E+02 |

FIG. 8A

| | EMBODIMENT 4: LENS DATA | | | | |
|---|---|---|---|---|---|
| | Si (SURFACE NUMBER) | Ri (RADIUS OF CURVATURE) | Di (SURFACE INTERVAL) | Ndj (REFRACTIVE INDEX) | vdj (ABBE NUMBER) |
| G1 | 1 | 1.874 | 0.69 | 1.531 | 55.5 |
| G1 | 2 | 6.928 | 1.34 | | |
| G2 | 3 | -2.010 | 0.41 | 1.531 | 55.5 |
| G2 | 4 | 5.433 | 0.08 | | |
| G3 | 5 | 1.031 | 1.10 | 1.531 | 55.5 |
| G3 | 6 | 1.893 | 1.00 | | |
| GC | 7 | ∞ | 0.30 | 1.516 | 64.1 |
| GC | 8 | ∞ | 0.16 | | |

(f=4.50, FNO.=5.0)

FIG. 8B

| | EMBODIMENT 4: ASPHERICAL SURFACE DATA | | | | | |
|---|---|---|---|---|---|---|
| ASPHERICAL SURFACE COEFFICIENT | SURFACE NUMBER | | | | | |
| | FIRST SURFACE | SECOND SURFACE | THIRD SURFACE | FOURTH SURFACE | FIFTH SURFACE | SIXTH SURFACE |
| K | 5.065E+00 | 0.000E+00 | 3.349E+00 | 7.297E+00 | -1.054E-01 | -5.279E+00 |
| $A_3$ | -7.060E-03 | 2.387E-02 | 9.563E-02 | -2.737E-01 | -2.964E-01 | 1.095E-01 |
| $A_4$ | 7.324E-02 | -1.335E-01 | 5.791E-02 | 2.060E-01 | -1.486E-03 | -2.301E-01 |
| $A_5$ | -5.630E-01 | 3.604E-01 | 7.223E-02 | -1.682E-02 | 3.245E-02 | 1.102E-01 |
| $A_6$ | 5.787E-01 | -4.057E-01 | -1.319E-01 | -5.130E-02 | 1.172E-02 | -6.615E-03 |
| $A_7$ | -1.525E-01 | -2.051E-01 | -3.647E-02 | -2.438E-02 | -3.135E-03 | -7.543E-03 |
| $A_8$ | 1.338E-01 | 2.292E-01 | 3.119E-02 | 1.715E-02 | -2.898E-03 | 5.738E-05 |
| $A_9$ | 1.317E+00 | 1.102E+00 | 3.627E-02 | 1.752E-02 | 4.057E-04 | 8.945E-04 |
| $A_{10}$ | -3.302E+00 | -1.208E+00 | -1.550E-02 | -9.584E-03 | 1.129E-04 | -1.662E-04 |

FIG. 8C

| EMBODIMENT 4: DIFFRACTING SURFACE DATA | |
|---|---|
| DOE COEFFICIENT | FIRST SURFACE |
| $C_1$ | -9.329E+01 |
| $C_2$ | 6.275E+01 |
| $C_3$ | -1.244E+02 |
| $C_4$ | 1.959E+02 |
| $C_5$ | -1.975E+02 |

FIG. 9

| CONDITIONAL EQUATION / EMBODIMENT | (1) f1/f | (2) D2/f | (3) ν123 | (4) \|ν123−ν2\| | (5) \|f2/f\| | (6) f3/f |
|---|---|---|---|---|---|---|
| 1 | 1.00 | 0.43 | 55.5 | 0.0 | 0.56 | 0.57 |
| 2 | 0.97 | 0.41 | 55.5 | 0.0 | 0.55 | 0.58 |
| 3 | 0.89 | 0.29 | 55.7 | 0.2 | 0.60 | 0.72 |
| 4 | 0.95 | 0.30 | 55.5 | 0.0 | 0.60 | 0.66 |

EMBODIMENT 1

FIG. 10A  SPHERICAL ABERRATION

FIG. 10B  ASTIGMATISM

FIG. 10C  DISTORTION

EMBODIMENT 2

FIG. 11A SPHERICAL ABERRATION

FIG. 11B ASTIGMATISM

FIG. 11C DISTORTION

EMBODIMENT 3

FIG. 12A SPHERICAL ABERRATION

FIG. 12B ASTIGMATISM

FIG. 12C DISTORTION

IMAGING LENS

BACKGROUND OF THE INVENTION

1. Field of the Invention

The present invention relates to an imaging lens mounted to imaging apparatus using an imaging element of CCD (Charge Coupled Device), CMOS (Complementary Metal Oxide Semiconductor) or the like, for example, a digital still camera, a cellular phone with a camera, and an information portable terminal (PDA: Personal Digital Assistance) and the like.

2. Description of Related Art

According to an imaging element of CCD, CMOS or the like, in recent years, small-sized formation and high pixel formation have been considerably progressed. Therefore, also a main body of the imaging apparatus as well as a lens mounted thereto which are small-sized, having a high function are requested. In order to achieve small-sized formation, shortened formation of a total length and small diameter formation (small-sized formation in a diameter direction orthogonal to an optical axis) are needed. Further, generally, according to an imaging optical system, other than small-sized formation, a telecentric performance, that is, making an angle of incidence of a principal ray to an imaging element near to parallel (an angle of incidence at the imaging surface becomes near to zero relative to a normal line of the imaging surface) is requested. In order to ensure the telecentric performance, it is advantageous to arrange an optical diaphragm aperture as proximate to an object side as possible. JP-A-2005-292235 discloses an imaging lens having a constitution having 3 lenses as a total thereof, and arranging an optical diaphragm aperture to the object side the most. Further, JP-A-2004-302058 discloses an imaging lens having a constitution having 3 lenses as a total thereof and arranging an optical diaphragm aperture between a first lens and a second lens.

Meanwhile, as high pixel formation of an imaging element has been progressed, it is requested for an imaging apparatus for taking an image of a still picture to provide a mechanical shutter to achieve a reduction in signal-noise at the imaging element. When the shutter is provided, it is advantageous to arrange the shutter proximately to an optical diaphragm aperture in order to reduce shading. On the other hand, according to the imaging lens having 3 lens constitution, in order to ensure the telecentric performance as described above, it is advantageous to arrange an optical diaphragm aperture as proximate to an object side as possible, for example, before or after the first lens. However, when a shutter mechanism is arranged before the first lens, the most object side, an arrangement becomes disadvantageous in view of small-sized formation. Hence, it is conceivable to arrange the shutter mechanism at inside of the lens system, between the first lens and the second lens. For that purpose, in the field of an imaging lens having 3 lens constitution it is desired to develop a lens having a high aberration performance in correspondence with high pixel formation while sufficiently ensuring an air interval between the first lens and the second lens for arranging the shutter mechanism. Although according to Embodiment 3 of JP-A-2005-292235, the interval between the first lens and the second lens is ensured to be comparatively wide to construct a lens constitution advantageous for arranging the shutter mechanism, it is desired to develop a lens having a high aberration function which is further advantageous for arranging the shutter mechanism. Further, although it is advantageous to use a lens having a special shape of an aspherical surface or the like in order to realize high function formation by a small number of lenses, in this case, it is preferable to select a pertinent lens material in consideration of a production performance and cost.

SUMMARY OF THE INVENTION

An object of an illustrative, non-limiting embodiment of the present invention is to a small-sized and high function imaging lens sufficiently ensuring an interval of an inner portion for arranging a shutter mechanism while maintaining a high aberration function in correspondence with high pixel formation by using a lens material advantageous for a production performance and a reduction in cost.

According to an aspect of the invention, there is provided a imaging lens including: in order from an object side of the imaging lens, a first lens having a positive refracting power; a second lens having a concave surface on the object side and having a negative refracting power; and a third lens having a positive refractive power and a meniscus shape having a convex surface on the object side and at a vicinity of an optical axis thereof. At least one surface of the first lens, the second lens and the third lens is an aspherical surface, and the imaging lens satisfies conditional equations shown below. Incidentally, f designates a focal length of the total system (the imaging lens), f1 designates a focal length of the first lens, D2 designates an interval between the first lens and the second lens on the optical axis, ν123 designates an average of Abbe numbers of the first lens, the second lens and the third lens, and ν2 designates an Abbe number of the second lens.

$$0.7 < f1/f < 1.3 \tag{1}$$

$$0.25 < D2/f < 0.50 \tag{2}$$

$$55 < \nu 123 \tag{3}$$

$$|\nu 123 - \nu 2| < 5 \tag{4}$$

The imaging lens can achieve small-sized formation by making shapes and refracting powers of the respective lenses with a constitution of a small number of 3 lenses as a total thereof. Further, by satisfying conditional equation (1), a power distribution of the first lens is optimized, which is advantageous for maintaining a high aberration function in correspondence with high pixel formation. Further, by satisfying conditional equation (2), the interval between the first lens and the second lens is widely ensured, which is advantageous for arranging a shutter mechanism. Further, by satisfying conditional equations (3) and (4), an increase in chromatic aberration is restrained while using a lens material advantageous for a production performance and a reduction in cost.

Further, the first lens may have a convex surface on the object side and at a vicinity of the optical axis thereof, and at least one of an object-side surface and an image-side surface of the first lens may be a diffracting surface. Thereby, higher function formation can be achieved. Particularly, even when constituted only by a material having a small difference between Abbe numbers of the respective lenses by satisfying conditional equation (4), chromatic aberration is excellently corrected.

Further, the imaging lens may satisfy conditional equations shown below. Thereby, power distributions of the respective lenses are optimized, and the high aberration function is maintained in correspondence with high pixel formation.

Incidentally, f2 designates a focal length of the second lens, f3 designates a focal length of the third lens.

$$0.3 < |f2/f| < 1.0 \quad (5)$$

$$0.5 < f3/f < 1.0 \quad (6)$$

BRIEF DESCRIPTION OF THE DRAWINGS

The features of the invention will appear more fully upon consideration of the exemplary embodiment of the invention, which are schematically set forth in the drawings, in which:

FIGS. 5A to 5C illustrate diagrams showing lens data of the imaging lens according to embodiment 1 of the invention, FIG. 5A shows lens data.

FIGS. 6A to 6C illustrate diagrams showing lens data of the imaging lens according to embodiment 2 of the invention, FIG. 6A shows lens data.

FIGS. 7A to 7C illustrate diagrams showing lens data of the imaging lens according to embodiment 3 of the invention, FIG. 7A shows lens data.

FIGS. 8A to 8C illustrate diagrams showing lens data of the imaging lens according to embodiment 4 of the invention, FIG. 8A shows lens data.

FIGS. 10A to 10C illustrate aberration diagrams showing various aberrations of the imaging lens according to embodiment 1 of the invention.

FIGS. 11A to 11C illustrate aberration diagrams showing various aberrations of the imaging lens according to embodiment 2 of the invention.

FIGS. 12A to 12C illustrate aberration diagrams showing various aberrations of the imaging lens according to embodiment 3 of the invention, FIGS. 13A to 13C illustrate aberration diagrams showing various aberrations of the imaging lens according to embodiment 4 of the invention.

DETAILED DESCRIPTION OF THE EXEMPLARY EMBODIMENTS

Although the invention will be described below with reference to the exemplary embodiments thereof, the following exemplary embodiments and modifications do not restrict the invention.

According to an image lens of the invention, materials of the respective lenses, shapes and refracting powers of the respective lenses, and arrangement of respective lenses are optimized by satisfying the conditional equations by the constitution having a small number of 3 lenses as a total thereof, and therefore, a small-sized high function lens system sufficiently ensuring an inner interval for arranging the shutter mechanism can be realized while maintaining the high aberration function in correspondence with the high pixel formation by using the lens material advantageous for the production performance and the reduction in cost. Further, particularly, when the first lens is provided with the diffracting surface, the chromatic aberration can excellently be corrected even when the respective lenses are constituted only by the same low cost lens material.

Exemplary embodiments of the invention will be explained in details in reference to the drawings as follows.

Figure 1:
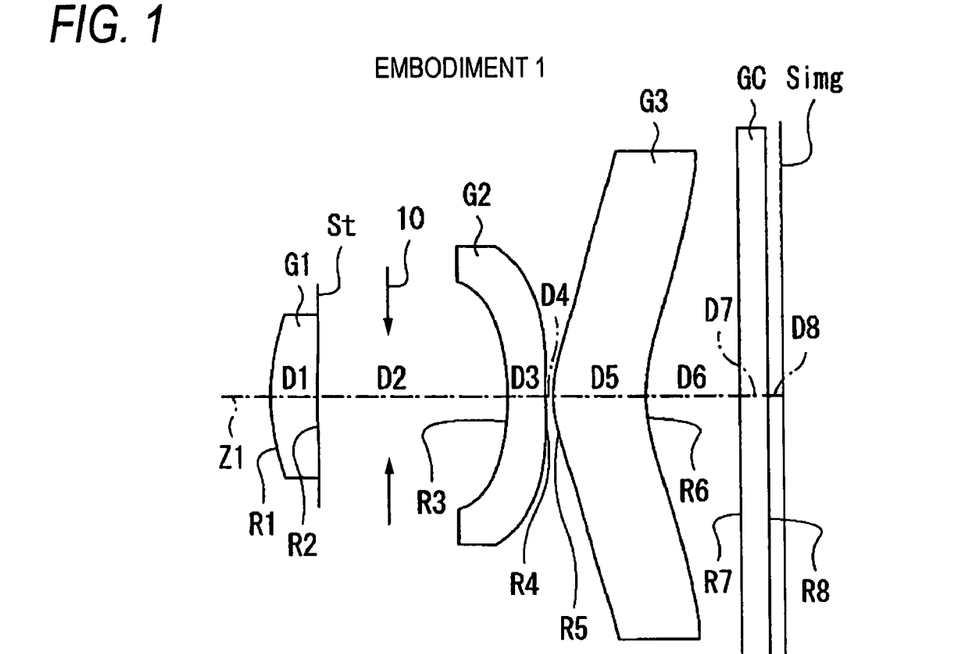
FIG. 1 is a lens sectional view in correspondence with an imaging lens according to embodiment 1 of the invention.
Figure 2:
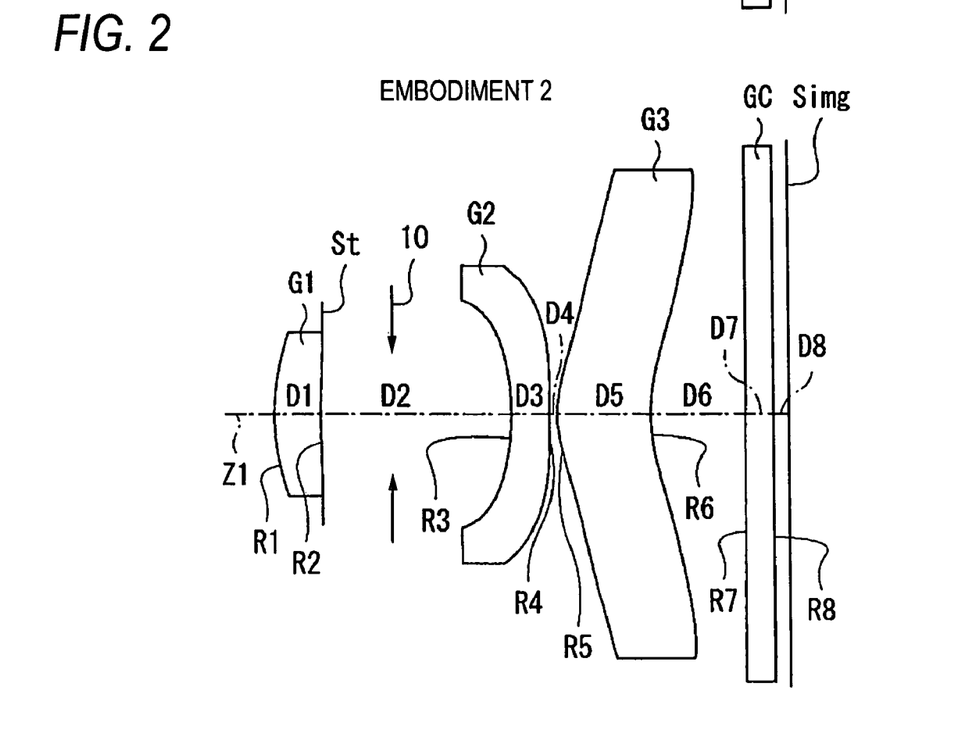
FIG. 2 is a lens sectional view in correspondence with an imaging lens according to embodiment 2 of the invention.
Figure 3:
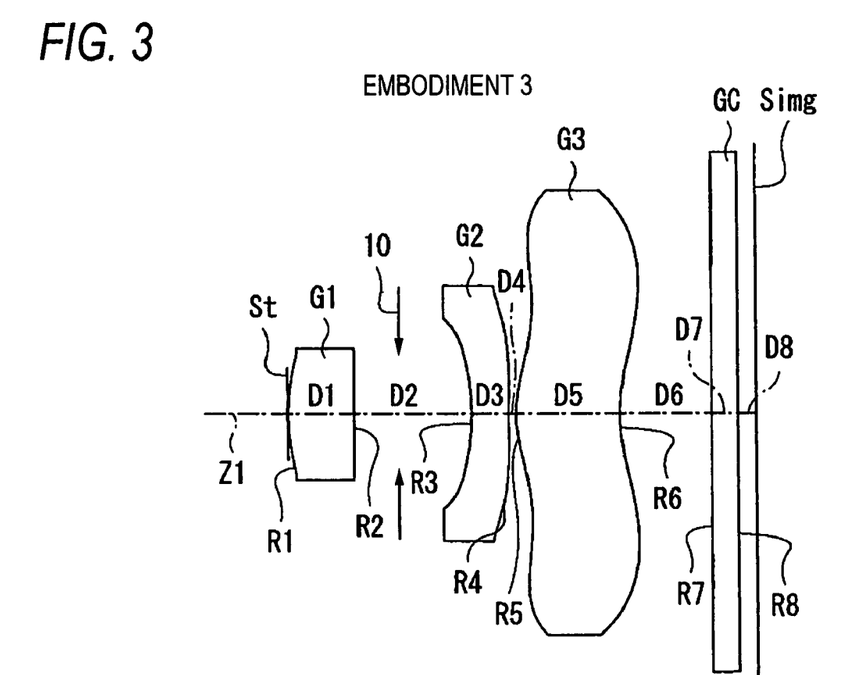
FIG. 3 is a lens sectional view in correspondence with an imaging lens according to embodiment 3 of the invention.
Figure 4:
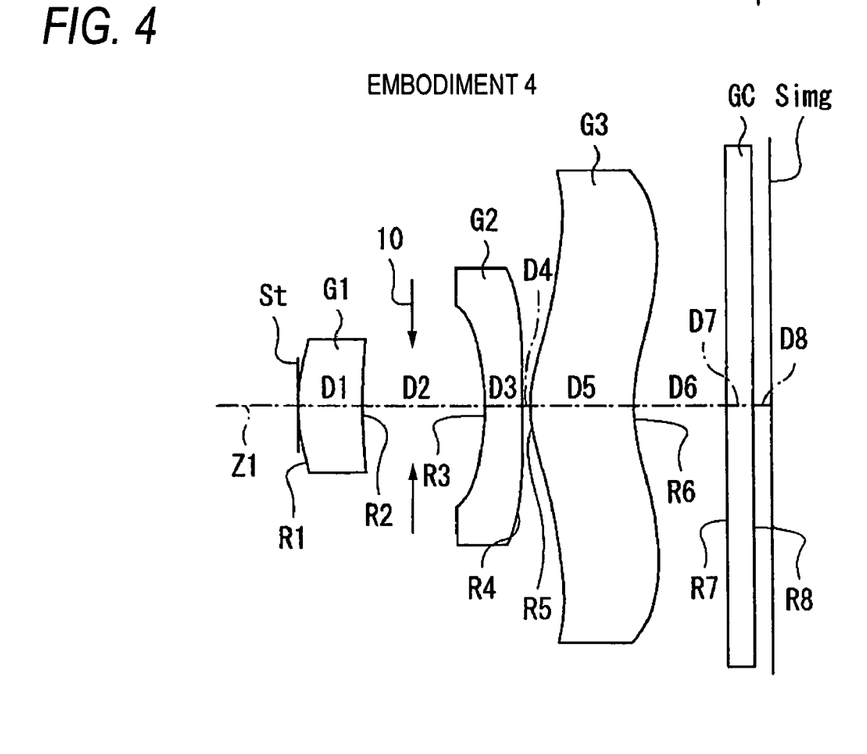
FIG. 4 is a lens sectional view in correspondence with an imaging lens according to embodiment 4 of the invention.
Figure 5A:
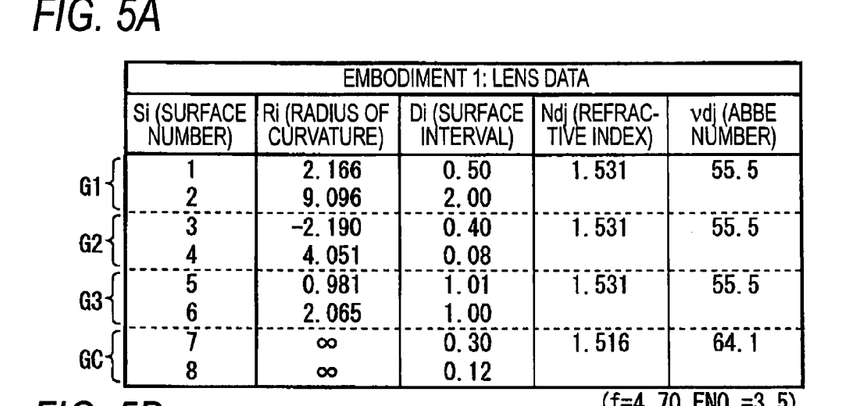
Figure 5B:
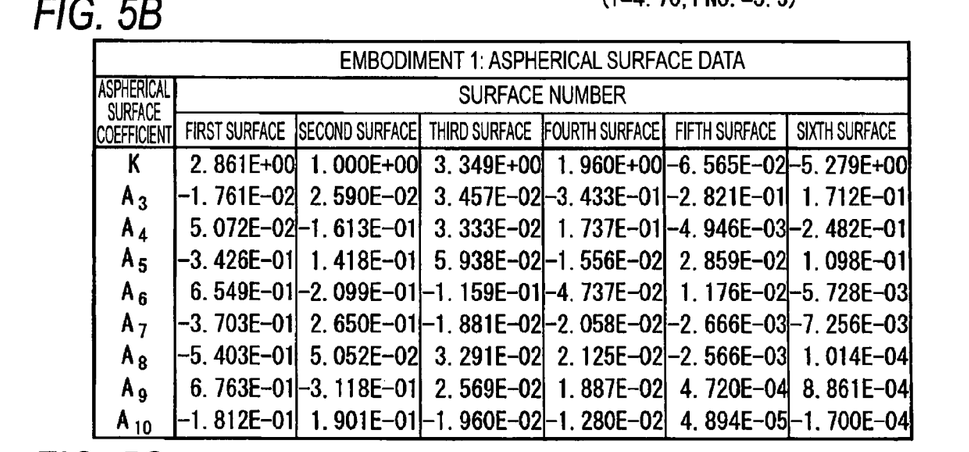
FIG. 5B shows lens data with regard to an aspherical surface.
Figure 5C:
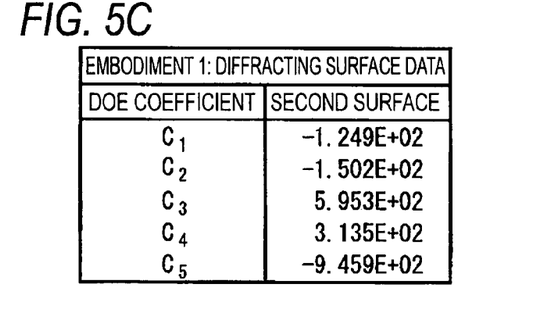
FIG. 5C shows data with regard to a diffracting surface.
Figure 6A:
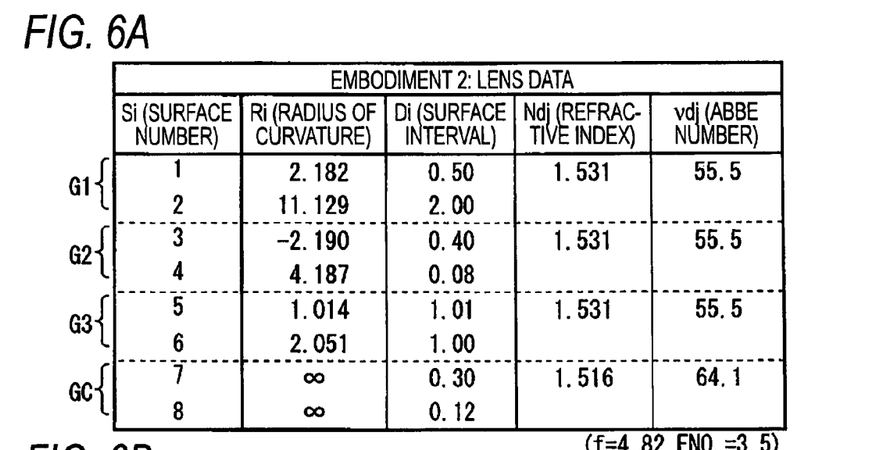
Figure 6B:
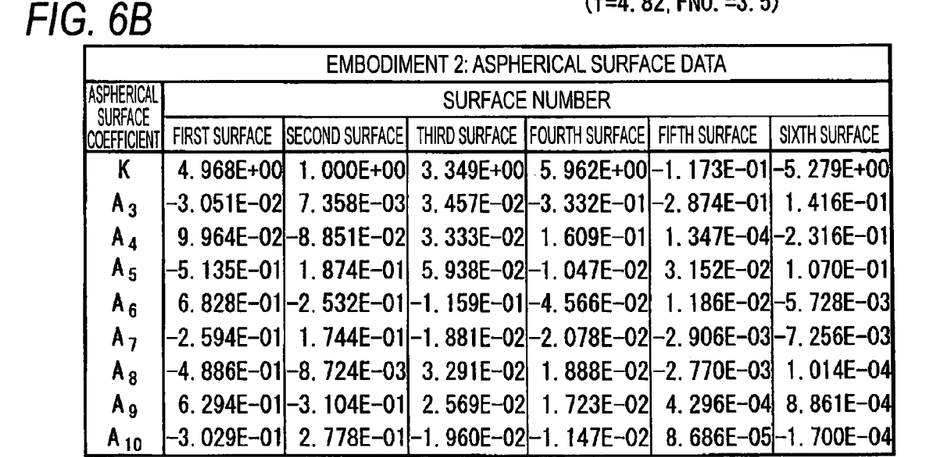
FIG. 6B shows a lens data with regard to an aspherical surface.
Figure 6C:
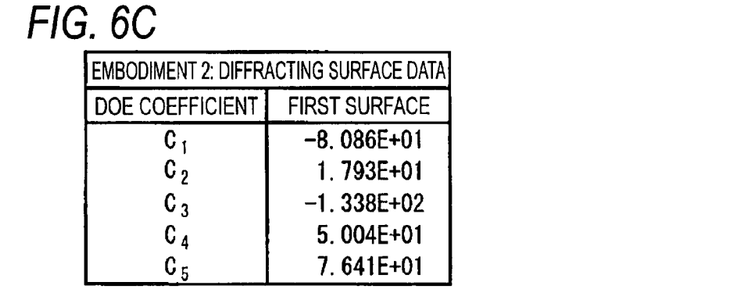
FIG. 6C shows data with regard to a diffracting surface.
Figure 7A:
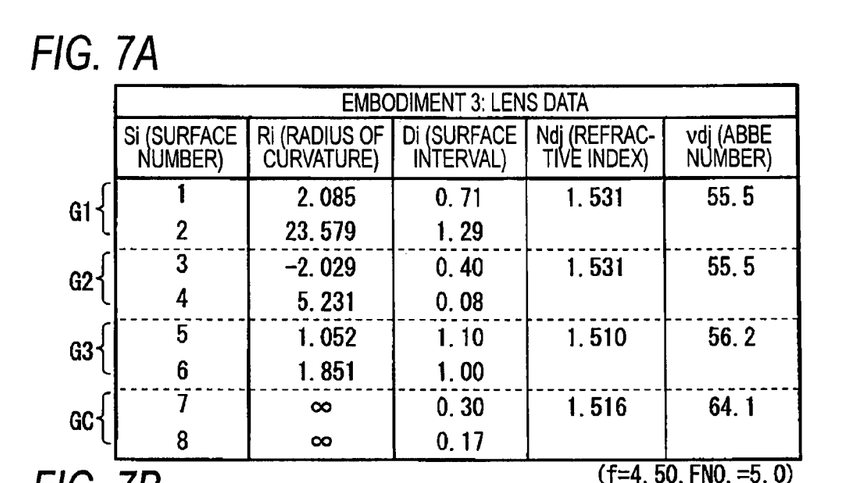
Figure 7B:
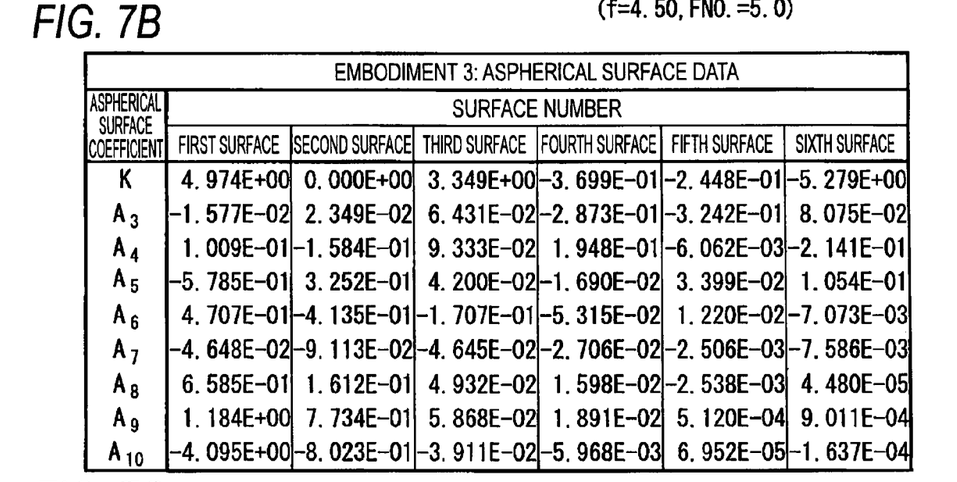
FIG. 7B shows a lens data with regard to an aspherical surface.
Figure 7C:
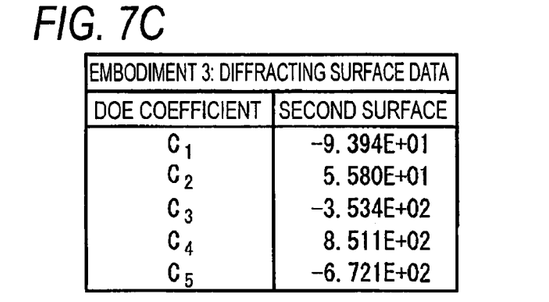
FIG. 7C shows data with regard to a diffracting surface.
Figure 8A:
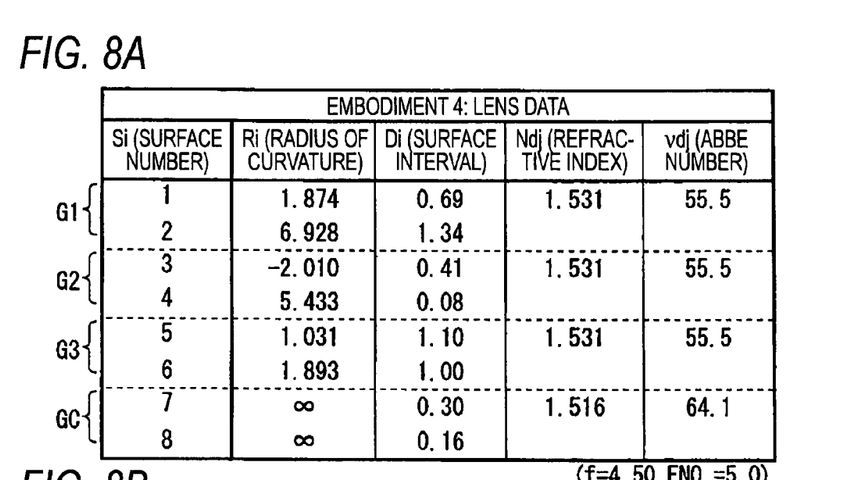
Figure 8B:
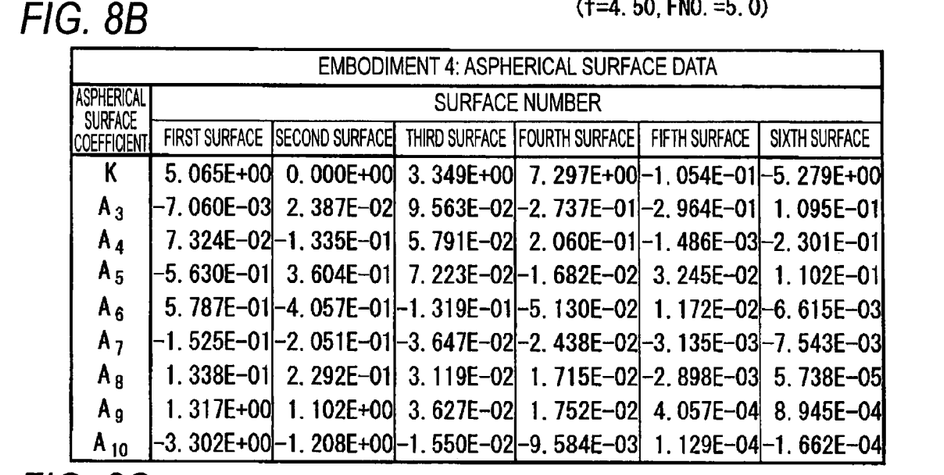
FIG. 8B shows a lens data with regard to an aspherical surface.
Figure 8C:
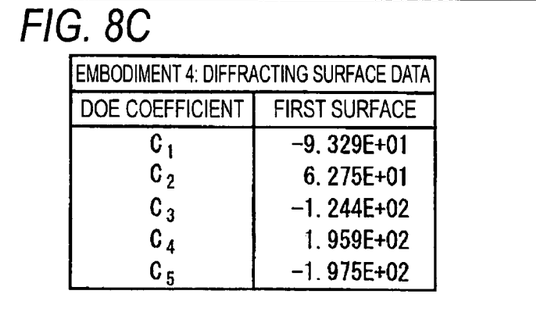
FIG. 8C shows data with regard to a diffracting surface.

FIG. 1 shows a first constitution example of an imaging lens according to an embodiment of the invention, corresponding to a lens constitution of a first numerical value embodiment (FIG. 5A to FIG. 5C) mentioned later. FIG. 2 shows a second constitution example, corresponding to a lens constitution of a second numeral value embodiment (FIG. 6A to FIG. 6C) mentioned later. FIG. 3 shows a third constitution example, corresponding to a lens constitution of a third numerical value embodiment (FIG. 7A to FIG. 7C) mentioned later. FIG. 4 shows a fourth constitution example, corresponding to a lens constitution of a fourth numerical value embodiment (FIG. 8A to FIG. 8C) mentioned later. In FIG. 1 to FIG. 4, notation Ri designates a-radius of curvature of an i-th surface attached with a notation such that a surface of a constituent element on the most object side is designated as 1-st surface and a notation is increased successively in accordance with being proximate to the image side (image formation side). Notation Di designates a surface interval between the i-th surface and the (i+1)-th surface on an optical axis Z1.

The imaging lens is preferably used in various imaging apparatus using an imaging element of CCD, CMOS or the like, for example, a digital still camera, a cellular phone with a camera, and an information portable terminal and the like. The imaging lens includes a first lens G1, a second lens G2, a third lens G3 in order from an object side along the optical axis Z1 of the imaging lens. At least one surface of the first lens G1, the second lens G2 and the third lens G3 is an aspherical surface.

It is preferable to arrange an optical diaphragm aperture St as proximate to the object side as possible in order to ensure a telecentric performance. According to the constitution examples of FIG. 1, FIG. 2, the diaphragm aperture St is arranged on a rear side of the first lens G1. According to the constitution examples of FIG. 3, FIG. 4, the diaphragm aperture St is arranged on a front side of the first lens G1, the most object side of the lens system. A shutter 10 is arranged between the first lens G1 and the second lens G2.

An image formation surface Simg of the imaging lens is arranged with an imaging element of CCD or the like. An interval between the third lens G3 and the imaging element is arranged with various optical members GC in accordance with a constitution of a camera side mounted with the lenses. For example, an optical member in a flat plate shape of, for example, a cover glass for protecting an imaging surface, an infrared ray cut filter or the like is arranged thereto.

The first lens G1 has a positive refracting power. Further, it is preferable that a surface on the object side of the first lens G1 is constituted by a convex shape at a vicinity of the optical axis, and a surface on either side of the object side or the image side is provided with a diffracting surface. Further, according to the constitution examples of FIG. 1 to FIG. 4, a shape at a vicinity of the optical axis of the first lens G1 is constituted by a positive meniscus shape directing a convex surface to the object side. The diffracting surface is provided at a second surface (surface on image side) in the constitution examples of FIG. 1, FIG. 3 and a first surface (surface on object side) in the constitution examples of FIG. 2, FIG. 4.

The second lens G2 has a concave surface on the object side and has a negative refracting power. It is preferable that the second lens G2 is constituted by a both concave shape at a vicinity of the optical axis. It is also preferable that the second lens G2 on the image side is constituted by a concave shape at a vicinity of the optical axis and a convex shape at a peripheral portion. Thereby, a numeral value range of conditional equation (5) mentioned later is easy to be satisfied.

The third lens G3 has a positive refractive power and a meniscus shape that has a convex surface on the object side and at a vicinity of the optical axis. The third lens G3 is a lens arranged on the most image surface side. Therefore, according to the third lens G3, light fluxes are separated for respective angles of view in comparison with the first lens G1 and the second lens G2. Therefore, by pertinently using an aspherical surface in the third lens G3, aberrations for the respective angles of view are easy to correct, and field curvature and distortion aberration are easy to correct. Further, the telecentric performance is easy to be ensured. According to the constitution examples of FIG. 1 to FIG. 4, a surface on the image side of the third lens G3 is constituted by a concave shape at a vicinity of the optical axis and a convex shape at a peripheral portion.

The imaging lenses satisfy the following conditions. Incidentally, f designates a focal length of the total system, f1 designates a focal length of the first lens G1, D2 designates an interval between the first lens G1 and the second lens G2 on the optical axis Z1, ν123 designates an average of Abbe numbers of the first lens G1 and the second lens G2 and the third lens G3, and ν2 designates Abbe number of the second lens G2.

$$0.7 < f1/f < 1.3 \tag{1}$$

$$0.25 < D2/f < 0.50 \tag{2}$$

$$55 < \nu 123 \tag{3}$$

$$|\nu 123 - \nu 2| < 5 \tag{4}$$

Further, it is preferable to satisfy the following conditional equations. Incidentally, f2 designates a focal length of the second lens G2, and f3 designates a focal length of the third lens G3.

$$0.3 < |f2|/f < 1.0 \tag{5}$$

$$0.5 < f3/f < 1.0 \tag{6}$$

Next, operation and effect of the imaging lens constituted as described above will be explained.

According to the imaging lens, by arranging the diaphragm aperture St on the front side or the rear side of the first lens G1 by the lens constitution of a number as small as 3 lenses as a total thereof, there is provided a lens system which is advantageous for shortening the total length and ensuring a telecentric performance. Further, by satisfying the conditional equations (1), (2), (5), (6), the refracting powers of the respective lenses and the arrangement of the respective lenses are optimized, the inner interval for arranging the shutter mechanism can sufficiently be ensured while maintaining the high aberration function in correspondence with the high pixel formation. Further, according to the imaging lens, the aberration is corrected further effectively by optimizing the aspherical surfaces of the respective surfaces. In order to correspond to the high pixel imaging element, it is requested to constitute the telecentric performance, that is, making the angle of incidence of the principal ray onto the imaging element proximate to parallel relative to the optical axis (the angle of incidence on the image taking surface is near to zero relative to the normal line of the imaging surface). According to the imaging lens, for example, by constituting the surface on the image side of the third lens G3 constituting the final lens surface the most proximate to the imaging element by the concave shape on the image side at the vicinity of the optical axis and convex shape on the image side at the peripheral portion, the aberration is pertinently corrected at the respective angles of view, and the angle of incidence of the light flux onto the imaging element is controlled to be equal to or smaller than a constant angle. Thereby, the shading over the entire region of the image focusing surface can be alleviated, further, it is advantageous for correcting the field curvature and the distortion aberration.

According to the imaging lens, the effective aperture of the first lens G1 is smaller than those of the second lens G2 and the third lens G3, further, the radius of curvature of the surface tends to be comparatively large. Particularly, the surface on the image surface side of the first lens G1 tends to be proximate to a plane comparatively. Therefore, when the diffracting surface is provided, it is preferable to provide the diffracting surface at the first lens G1 in view of an easiness in a workability. Further, by providing the diffracting surface at the first lens G1, in comparison with a case of providing the diffracting surfaces to the second lens G2 and the third lens G3, the chromatic aberration is easy to be corrected. Further, by providing the diffracting surface, design parameters are increased, and therefore, it is advantageous in view of small-sized formation and correction of various aberrations, and higher function formation is easy to be achieved. Particularly, in a lens of a so-to-speak hybrid type combining a diffracting surface and a refracting lens, in comparison with a normal refracting lens, a different dispersing operation is provided, and therefore, in comparison with a constitution using only a normal refractive index lens, the chromatic aberration is easy to be corrected. Therefore, for example, even when all of respective lenses are constituted by the same material, or the lenses are constituted by combining only lens materials having a small difference of Abbe numbers there among, the chromatic aberration can excellently be corrected. Further, whether the diffracting surface is provided may be determined in accordance with the specification of the lens. For example, although when importance is given to the specification of the lens, it is preferable to provide the diffracting surface, when importance is given to a reduction in cost, also a constitution of not providing the diffracting surface positively is conceivable.

Conditional equation (3) and conditional equation (4) are related to Abbe numbers of respective lenses for rectifying pertinent combinations of the respective lenses. Although it is conceivable to constitute all of the respective lenses by the same material or constitute the respective lenses only by the materials having similar functions in order to achieve a reduction in cost, in this case, it is preferable to satisfy conditional equation (3) and conditional equation (4). When deviated from ranges of the conditional equations, in a case of constituting the respective lenses by the same material or the similar materials, the chromatic aberration is increased and therefore, the deviation is not preferable. Further, even when only lens materials having a small difference of Abbe numbers there among are combined to constitute by satisfying conditional equation (4), as described above, by providing the diffracting surface, the remaining chromatic aberration can effectively be corrected. Further, according to the imaging lens, it is preferable to use a plastic material in view of easiness in working the aspherical surface and working the diffracting surface. In this case, a currently developed plastic material frequently satisfies conditional equations (3), (4), further preferably, satisfying the following conditional equation (7) which can be obtained inexpensively, and therefore, the material is advantageous in view of reduction in cost.

$$50 < v1, v2, v3 < 60 \quad (7)$$

wherein v1 is an Abbe number of the first lens G1;
v2 is an Abbe number of the second lens G2; and
v3 is an Abbe number of the third lens G3.

Conditional equation (1) relates to the focal length f1 of the first lens G1, and when the upper limit of Conditional equation (1) is not satisfied, the power of the first lens G1 becomes excessively small and the field curvature is difficult to be corrected. Further, when the lower limit of Conditional equation (1) is not satisfied, an emitting pupil angle becomes excessively large, which is not preferable.

Conditional equation (2) relates to the interval D2 between the first lens G1 and the second lens G2 and the focal length of the total, and when the upper limit of Conditional equation (2) is not satisfied, it is difficult to shorten the total length. Further, when the lower limit of Conditional equation (2) is not satisfied, the interval D2 between the first lens G1 and the second lens G2 cannot sufficiently be ensured and it is difficult to arrange the shutter mechanism, which is not preferable.

Conditional equation (5) relates to the focal length f2 of the second lens G2, and when the upper limit of Conditional equation (5) is not satisfied, the power of the second lens G2 becomes excessively small and it is difficult to shorten the total length. Further, when the lower limit of Conditional equation (5) is not satisfied, it is difficult to correct the image surface bending and astigmatism or the like, which is not preferable. Conditional equation (6) relates to the focal length f3 of the third lens G3, and when Conditional equation (6) is not satisfied, a power balance with the second lens G2 is collapsed and it is difficult to correct the various aberrations while maintaining the total length to be short, which is not preferable.

As has been explained above, according to the imaging lens according to the embodiment, the materials of the respective lens, the shapes and the refracting powers of the respective lenses and arrangement of the respective lenses are optimized by satisfying the predetermined conditional equations by the lens constitution as small as 3 lenses as a total thereof, and therefore, there can be realized a small-sized and high function lens system sufficiently ensuring the inner interval for arranging the shutter mechanism while maintaining the high aberration function in correspondence with the high pixel formation by using the lens material advantageous for the production performance or the cost reduction. Further, the respective lenses can be constituted by the same glass material while maintaining the chromatic aberration function, and therefore, a performance of the glass material is promoted and the production cost can be reduced.

Next, specific numerical value embodiments 1 through 4 of the imaging lens according to the embodiment will be explained.

As embodiments 1 to 4, specific lens data in correspondence with the constitutions of the imaging lenses shown in FIGS. 1 to 4 are shown in FIGS. 5A to FIG. 5C, FIGS. 6A to 6C, FIGS. 7A to 7C, and FIGS. 8A to 8C. Further, FIGS. 5A, 6A, 7A and 8A in the drawings show a lens data, FIGS. 5B, 6B, 7B and 8B in the drawings show data with regard to aspherical surfaces, and FIGS. 5C, 6C, 7C and 8C in the drawings show data with regard to diffracting surfaces.

As the lens data, values of a surface number Si, a radius of curvature Ri (mm), a surface interval Di (mm), a refractive index Ndj and an Abbe number vdj, a near axis focal length f (mm) of the total system and an F number (FNO.) are shown. The surface number Si shows an i-th (i=1 through 8) surface number a notation of which is attached such that a surface of a constituent element on the most object side is designated as 1-st surface and the surface number successively increases in accordance with being proximate to the image side. The radius of curvature Ri shows a value of a radius of curvature of a surface in correspondence with notation Ri attached in FIG. 1. The surface interval Di shows an interval between an i-th surface Si and an (i+1)-th surface Si+1 on an optical axis. The refractive index Ndj shows a refractive index at the d-line (wavelength 587.6 nm) of a j-th (j=1 to 4) optical element from the object side. The Abbe number vdj shows an Abbe number for d radiation of a j-th optical element from the object side. Further, in any of the imaging lenses of embodiments 1 to 4, all of the surfaces of the first lens G1, the second lens G2 and the third lens G3 are provided with aspherical shapes, and therefore, with regard to the radius of curvature Ri, a value of a radius of curvature at a vicinity of the optical axis is shown.

Particularly, according to embodiments 1, 2, 4, all of the respective lenses of the first lens G1, the second lens G2 and the third lens G3 are constituted by the same material.

With regard to the aspherical surface data, values of respective coefficients $A_n$, K in equation (a) of an aspherical surface shape shown bellow are shown. In this case, notation "E" shows that a numerical value successive thereto is "power index" constituting a bottom by 10, and a numerical value shown by an index function constituting the bottom by 10 is multiplied by a numerical value before "E". For example, "1.0E-02" becomes "$1.0 \times 10^{-2}$". Further, in equation (a), Z shows a length (mm) of a perpendicular drawn down from a point on an aspherical surface disposed at a position of a height h from an optical axis Z1 to a contact surface (a plane orthogonal to the optical axis Z1) of an apex of the aspherical surface. Further, in embodiments 1 to 4, all of surfaces are constituted by aspherical surfaces, and are shown by effectively utilizing third order through tenth order coefficients $A_3$ to $A_{10}$ as aspherical surface coefficients $A_n$.

$$Z = C \cdot h^2 / \{1 + (1 - K \cdot C^2 \cdot h^2)^{1/2}\} + \Sigma A_n \cdot h^n \quad (a)$$

(n=an integer equal to or larger than 3)

where,

Z: depth of aspherical surface (mm),
h: distance (height) from optical axis to lens surface (mm),
K: eccentricity (second order aspherical surface coefficient),
C: near axis curvature=1/R,
(R: near axis radius of curvature),
$A_n$: n-th order aspherical surface coefficient.

As diffracting surface data, with regard to a surface provided with a diffracting surface, values of respective coefficients (DOE (Diffractive Optical Element) coefficient) $C_1$ through $C_5$ in equation (b) shown below are shown. In equation (b), $\phi(h)$ shows a phase difference function, thereby, a diffracting surface is designed by converting a phase of a wave surface. Further, the surface provided with the diffracting surface is constituted by the second surface in embodiment 1 and embodiment 3 and constituted by the first surface in embodiment 2 and embodiment 4.

$$\phi(h) = C_1 \cdot h^2 + C_2 \cdot h^3 + C_3 \cdot h^4 + C_4 \cdot h^5 + C_5 \cdot h^6 \quad (b)$$

(h: height from optical axis)

Figure 9:
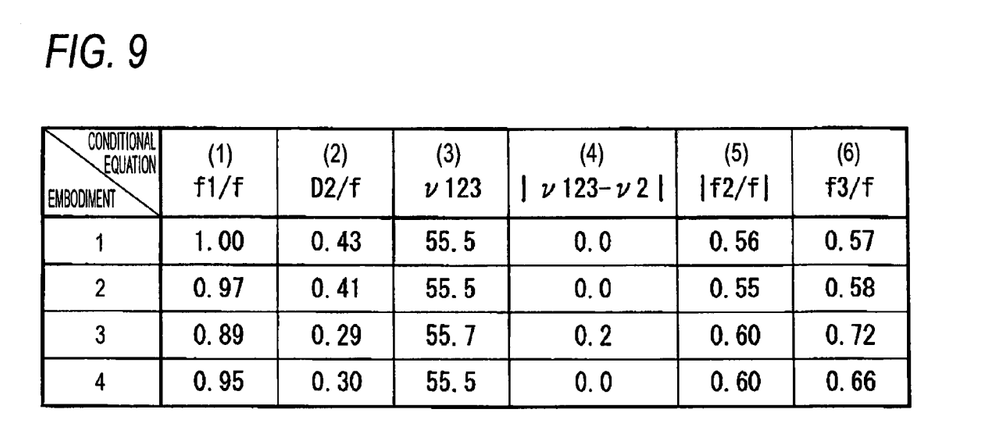
FIG. 9 is a diagram showing values with regard to conditional equations for respective embodiments.
Figure 10A:
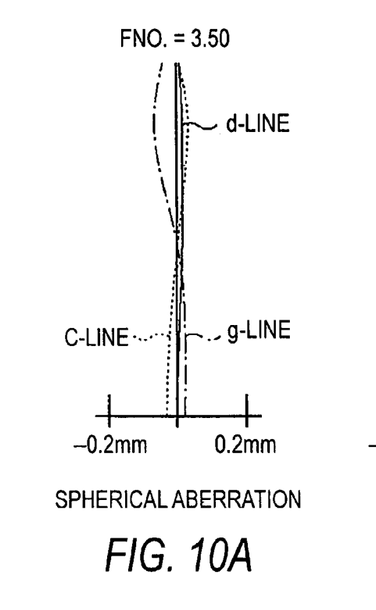
FIG. 10A shows a spherical aberration.
Figures 10B, 10C:
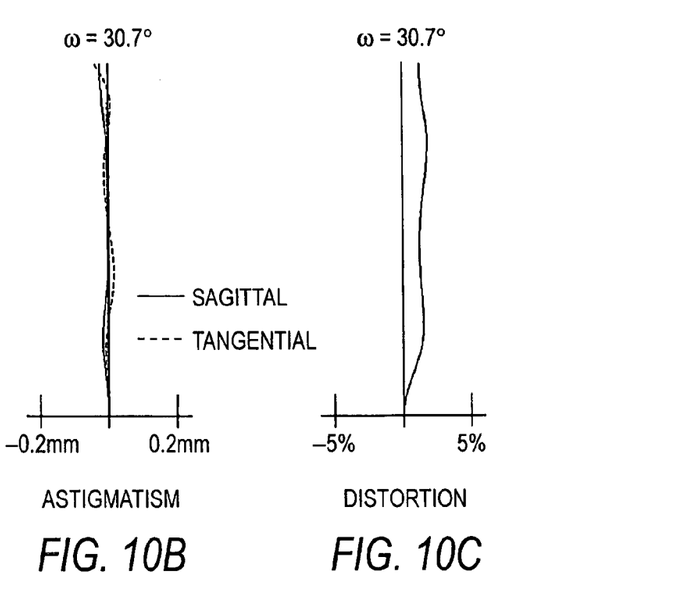
FIG. 10B shows an astigmatism.
FIG. 10C shows a distortion.
Figure 11A:
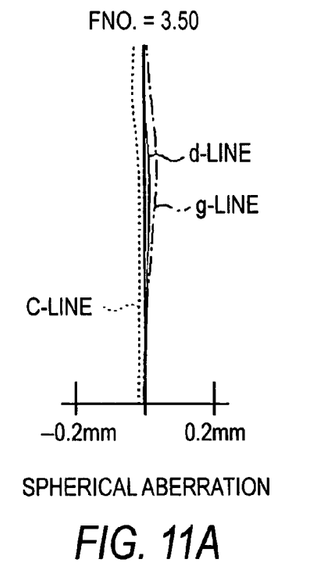
FIG. 11A shows a spherical aberration.
Figure 11B:
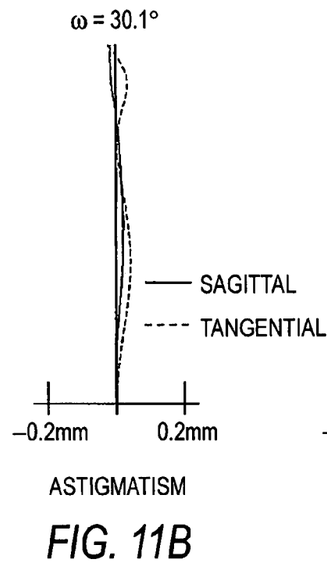
FIG. 11B shows an astigmatism.
Figure 11C:
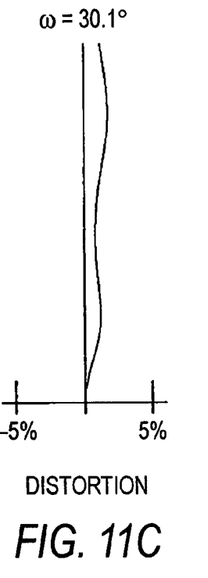
FIG. 11C shows a distortion.
Figure 12A:
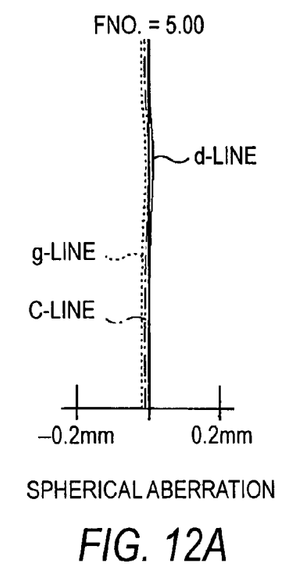
FIG. 12A shows a spherical aberration.
Figure 12B:
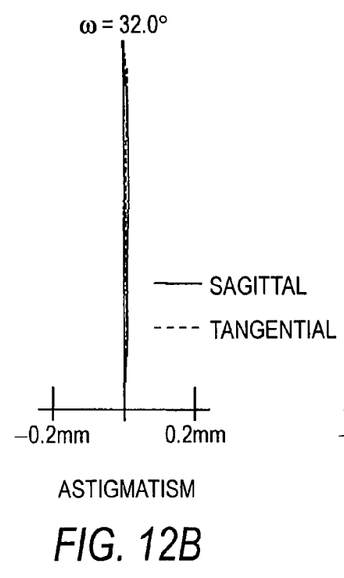
FIG. 12B shows an astigmatism.
Figure 12C:
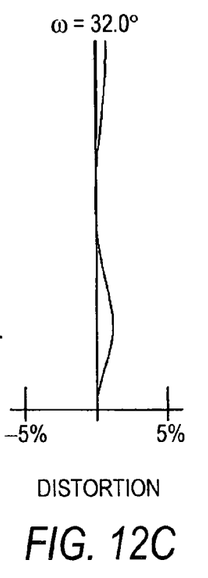
FIG. 12C shows a distortion.
Figure 13A:
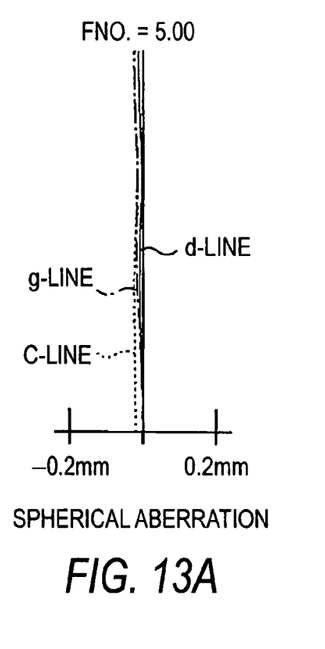
FIG. 13A shows a spherical aberration.
Figures 13B, 13C:
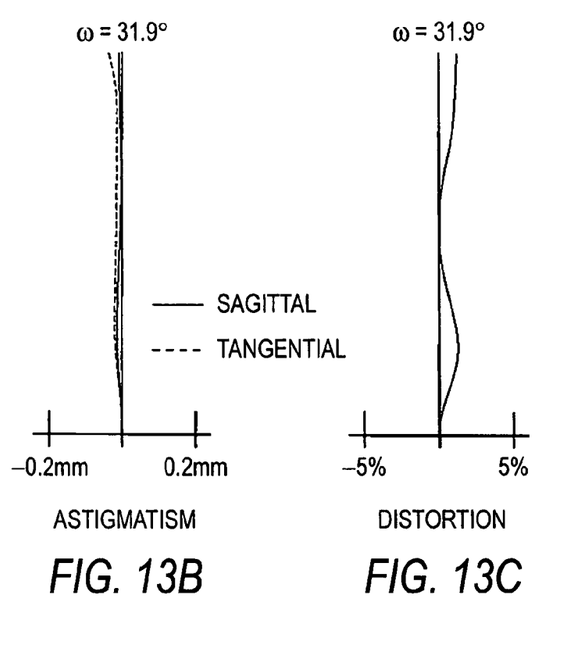
FIG. 13B shows an astigmatism.
FIG. 13C shows a distortion.

FIG. 9 shows values with regard to the above-described respective conditional equations in embodiments 1 to 4. As is known from FIG. 9, values of the respective embodiments fall in numerical value ranges of the respective conditional equations.

Further, various aberrations of imaging lenses according to embodiments 1 to 4 are shown in FIGS. 10A to 10C, FIGS. 11A to 11C, FIGS. 12A to 12C and FIGS. 13A to 13C. FIGS. 10A, 11A, 12A and 13A in the drawings show spherical aberrations, FIGS. 10B, 11B, 12B and 13B shows astigmatisms, and FIGS. 10C, 11C, 12C and 13C show distortions (distortion aberrations). In the respective aberration diagrams, aberrations constituting a reference wavelength by d radiation are shown. In the spherical aberration diagrams, also aberrations at the g-line (wavelength 435.8 nm) and the C-line (wavelength 656.3 nm) are shown. In the astigmatism diagrams, a bold line shows the aberration in a sagittal direction, a broken line shows the aberration in a tangential direction. FNO. shows the F value, $\omega$ shows a half angle of view.

As is known from the respective numerical data and the respective aberration diagrams, with regard to the respective embodiments, there can be realized a small-sized and high function imaging lens system optimizing surface shapes of the respective lenses and power distributions of the respective lenses and sufficiently ensured with inner intervals for arranging the shutter mechanisms by 3 lens constitution as a total thereof. Further, a lens constitution optimizing the material of the lens and advantageous in the production performance and the cost reduction can be realized. Particularly, in embodiments 1, 2, 4, by effectively utilizing the diffracting surface while achieving the cost reduction by constituting the respective lenses by the same material, the chromatic aberration is excellently corrected, and the high function formation can be realized.

Further, the invention is not limited to the embodiment and the respective embodiments but can variously be modified and embodied. For example, values of the radii of curvature, surface intervals and refractive indices of the respective lens components are not limited to values shown in the respective numerical embodiments but can take other values.

This application claims foreign priority from Japanese Patent Application No. 2006-146992, filed May 26, 2006, the entire disclosure of which is herein incorporated by reference.

What is claimed is:

1. An imaging lens comprising: in order from an object side of the imaging lens,
a first lens having a positive refracting power;
a second lens having a concave surface on the object side and having a negative refracting power; and
a third lens having a positive refractive power and a meniscus shape having a convex surface on the object side and at a vicinity of an optical axis thereof,
wherein at least one surface of the first lens, the second lens and the third lens is aspherical, and the imaging lens satisfies conditional equations:

$$0.7 < f1/f < 1.3 \quad (1)$$

$$0.25 < D2/f < 0.50 \quad (2)$$

$$55 < v123 \quad (3)$$

$$|v123 - v2| < 5 \quad (4)$$

$$0.3 < |f2/f| < 1.0 \quad (5)$$

wherein
f is a focal length of the imaging lens;
f1 is a focal length of the first lens;
f2 is a focal length of the second lens;
D2 is an interval between the first lens and the second lens on the optical axis
v123 is an average of Abbe numbers of the first lens, the second lens and the third lens; and
v2 is an Abbe number of the second lens.

2. The imaging lens according to claim 1, wherein the first lens has a convex surface on the object side and at a vicinity of the optical axis thereof, and at least one of an object-side surface and an image-side surface of the first lens is a diffracting surface.

3. The imaging lens according to claim 1, further satisfying conditional equations:

$$0.5 < f3/f < 1.0 \quad (6)$$

wherein
f3 is a focal length of the third lens.

4. The imaging lens according to claim 2, further satisfying conditional equations:

$$0.5 < f3/f < 1.0 \quad (6)$$

wherein
f3 is a focal length of the third lens.

* * * * *